United States Patent Office 3,570,827
Patented Mar. 16, 1971

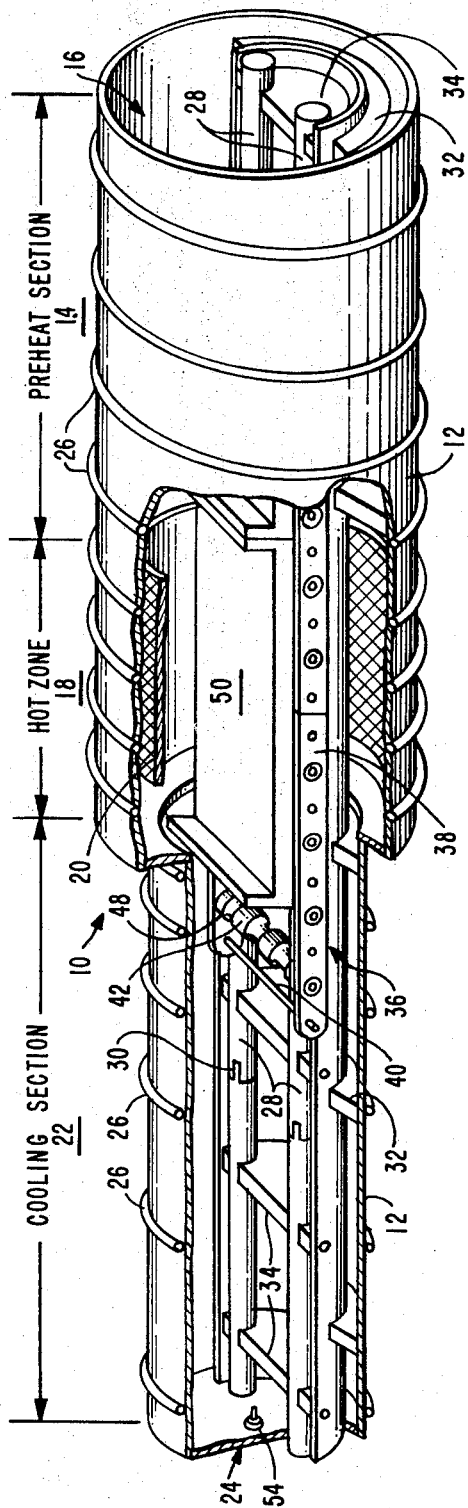
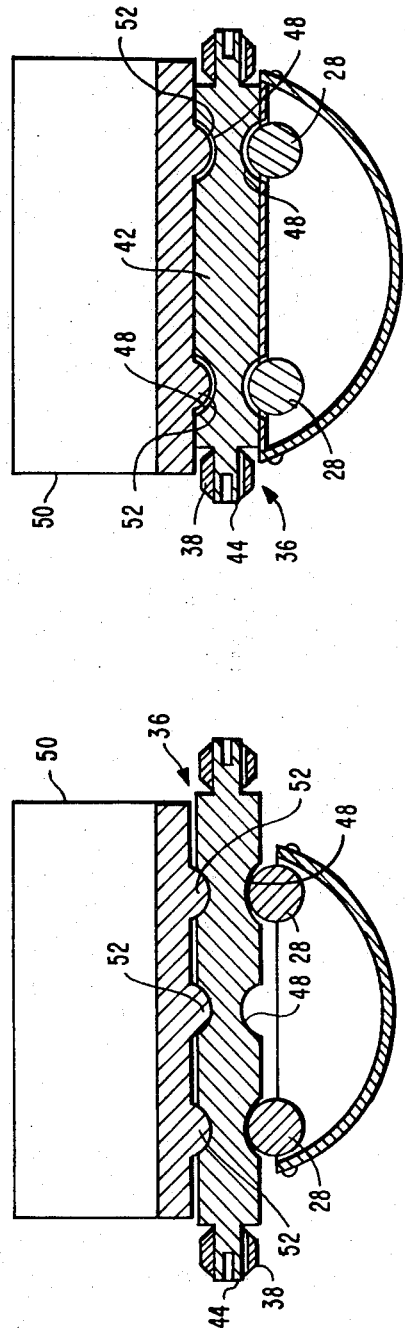
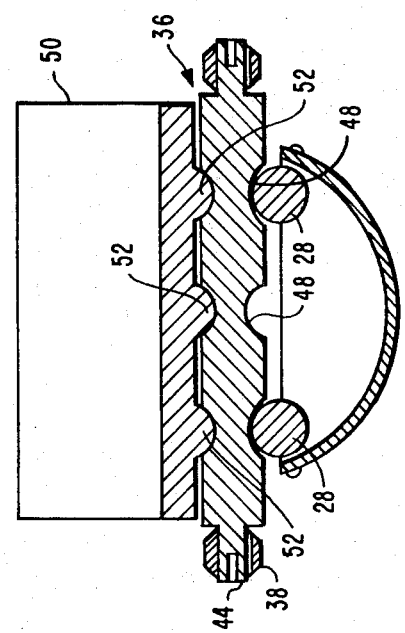

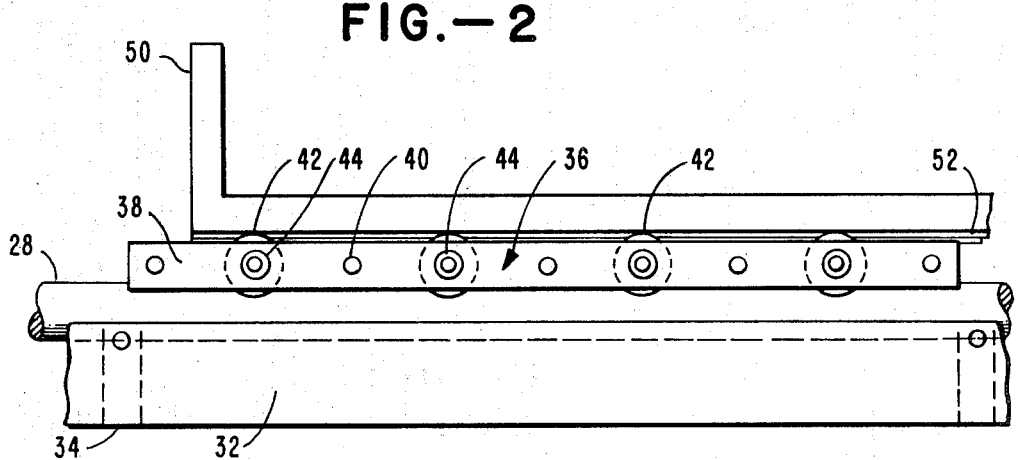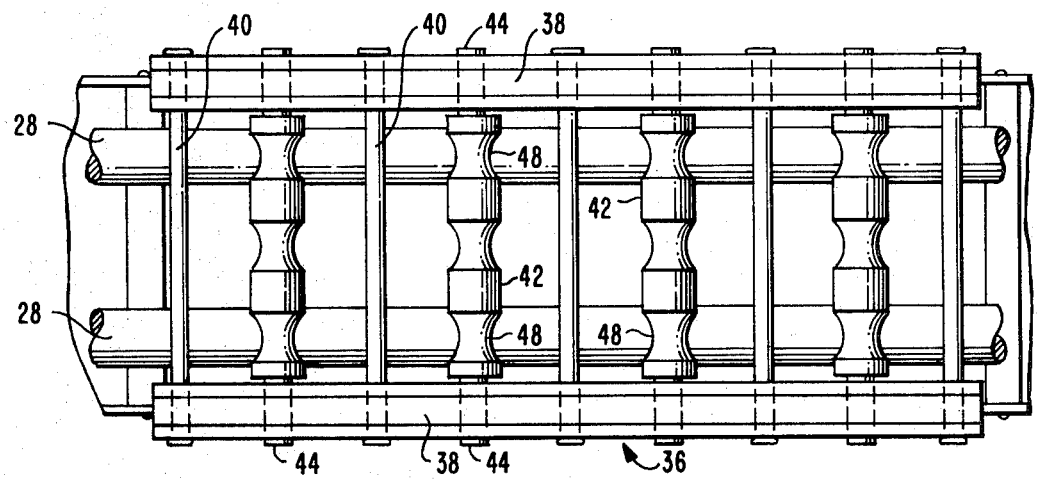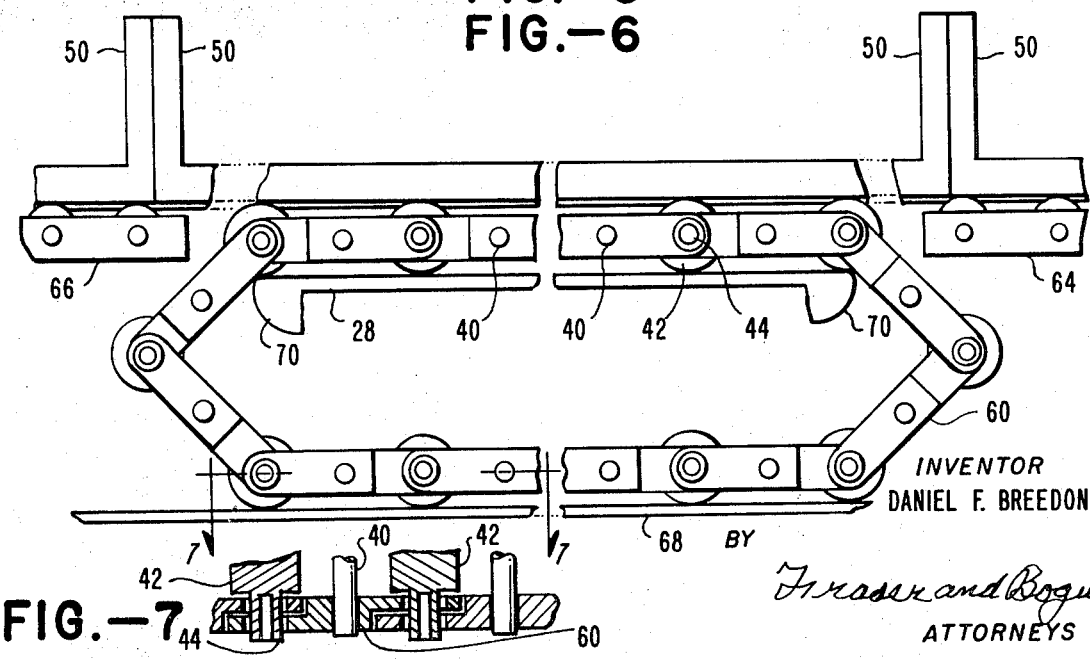

3,570,827
HIGH TEMPERATURE ROLLER CONVEYOR
Daniel F. Breedon, Goleta, Calif., assignor to Central Marking Systems, Inc., doing business as Astro Industries Inc.
Filed Apr. 1, 1969, Ser. No. 811,946
Int. Cl. F27b 9/14, 9/24
U.S. Cl. 263—6                              13 Claims

ABSTRACT OF THE DISCLOSURE

A roller conveyor system particularly suited for providing a continuous process high temperature furnace has a series of cylindrical rollers journaled parallel to one another in a supporting frame for free rotation. Each load of material to be heated is supported with its under surface in direct contact with the upper surfaces of the roller members, while the bottom roller surfaces are in direct contact with the surface of a horizontal track assembly so that the underlying rollers roll over the track surface to move the load longitudinally over the upper roller surfaces.

BACKGROUND OF THE INVENTION

(1) Field of the invention

This invention relates to conveyor systems for use in extreme temperature environments, such as sintering furnaces, for horizontally transporting heavy loads.

(2) Description of the prior art

Recently the demand for certain materials that have to be processed or treated at extremely high temperatures in special furnaces has greatly increased. For the most part, such high temperature furnaces have heretofore been used only for batch processing. By this method, the furnace is heated up to the required temperature for the desired interval with a batch quantity of the material inside, and then is allowed to cool before removal of the material to permit treatment of another batch. Whereas such batch processing can be used to treat small quantities of material, the heating and cooling cycle required for each separate batch is extremely inefficient and time consuming. For larger quantities, the more efficient methods of continuous processing are far superior.

In continuous processing, a succession of material loads are carried by a suitable conveyor through the furnace, first through a preheater section where the temperature is gradually increased as it moves to the high temperature region of a hot zone. The speed of movement is such that each piece of material spends the required time in the hot zone passing into a cooling section where the temperature is gradually reduced as it moves toward the exit for unloading. Such continuous heat treatment techniques have previously been widely employed in furnaces or ovens where maximum temperatures are relatively moderate. However, conventional continuous processing systems generally cannot be employed where temperatures exceeding 1000° F. are encountered because of the lack of suitable conveyor systems that can operate at their elevated temperatures.

In some instances furnace temperatures as high as several thousand degrees F. are encountered. Conventional conveyor systems, even those constructed of special high temperature materials, cannot be reliably used at these temperatures since lubrication between bearing surfaces is impossible, and even special high temperature materials tend to soften and bind or gall at high pressure points along load bearing surfaces. The problems involved in using conventional conveyors is particularly acute where the material to be treated is very heavy, such as certain radioactive alloys, since the heavy pressure on conventional bearing surfaces increases the tendency of the heat softened materials to bind or gall.

To avoid these problems, suggestions have been made for sliding the materials through the high temperature furnace on a smooth horizontal surface. However, substantial problems arise in properly guiding the sliding movement of a long line of successive loads to prevent misalignment and possible jamming, and a substantial force would be required to overcome the frictional resistance to this sliding motion.

SUMMARY OF THE INVENTION

The invention involves a unique roller conveyor system for high temperature furnaces that eliminates the need for conventional load supporting bearings. The entire weight of the material to be processed is supported on a track extending longitudinally through the furnace solely on individual rollers. Material containers commonly referred to as "boats," rest directly on the upper surface of the rollers, while the bottom surfaces of the rollers contact the upper surface of a track assembly. As the rollers move forward over the track, the containers move longitudinally over the top surfaces of the rollers.

Each roller is journaled for free rotation within a frame assembly that maintains adjacent rollers in spaced apart parallel relationship along the track. Since the containers are supported solely on the rollers, no substantial weight load is carried by the frame assembly so that heavy load bearings are unnecessary. The only bearing surfaces between the rollers and the frame assembly need only support the relatively light weight of the frame members.

In a preferred embodiment, the track consists of parallel rails extending the length of the furnace, with the rollers having circumferential concave grooves formed to fit the upper surface of the rails to guide the rollers longitudinally along the track. The container or boat in which the material is placed has longitudinal ridges along its bottom surface that fit into the upper part of the roller to guide the container in its movement over the rollers.

In the preferred embodiment, several rollers are mounted in separate rectangular frame assemblies that are placed end-to-end on the track at the entrance end of the furnace as required to carry additional loads. In another embodiment, adjacent rollers are each connected by short rectangular frame linkages to form a continuous chain. This roller chain is placed in the furnace with an upper section on the tracks to move the loads through the furnace and a lower section moving in the opposite direction along a return path.

BRIEF DESCRIPTION OF THE DRAWINGS

FIG. 1 is a perspective view of a continuous processing horizontal furnace in accordance with the invention employing a preferred form of the roller conveyor system;

FIG. 2 is a side view showing the principal elements of the roller conveyor system illustrated in FIG. 1;

FIG. 3 is a top view of the elements of the roller conveyor system shown in FIG. 1 without the material container in place;

FIG. 4 is a front full sectional view of the elements of the roller conveyor system of FIGS. 2 and 3 taken along the lines 4—4;

FIG. 5 is a full sectional view showing the principal elements of another embodiment of the roller conveyor system in accordance with the invention containing certain modifications;

FIG. 6 is a schematic illustration of a further embodiment of a roller conveyor system in which the rollers are connected to form a continuous belt; and, FIG. 7 is a partial top sectional view showing a broken away portion of the continuous belt of FIG. 6 taken along the line 7—7.

DETAILED DESCRIPTION

Referring now to FIG. 1, a continuous process horizontal high temperature oven assembly 10 has an elongated cylindrical outer housing 12 defining an initial preheating section 14 having a loading entrance 16, an intermediate high temperature furnace region or hot zone 18 containing a heater element 20, and a cooling section 22 having an unloading exit 24 at the end. The outer housing 12 is constructed of a suitable heat resistant metal or other material with a spiral pattern of cooling water circulating tubes 26 formed in the outer walls, or attached thereto in a heat exchanging relationship. Appropriate insulating material (not shown) is used to line the interior walls of the housing 10 to reduce heat transfer, particularly in the hot zone 18. Cooling water pumped through the spiral tube arrangement then acts to remove heat that penetrates the insulation to reach the housing walls 12.

A longitudinal track assembly, in this embodiment a pair of parallel cylindrical rails 28, is supported to extend horizontally through the entire length of the furnace housing 12. Each of the rails 28 is separated into small segments having tongue in groove end connections that permit thermal expansion and easy disassembly and removal of the rails for occasional cleaning or replacement. The rails 28 are held in position by an appropriate support structure including a removable metal trough 32 that extends the length of the lower portion within the furnace housing walls 12 and is supported in position by a series of arcuate insulation members 33. A series of metal partitions 34 having a curved under surface formed to fit the interior dimensions of the trough 32 are spaced at regular intervals to engage the lower surfaces of the rails 28 in concave circular grooves spaced transversely on the upper surface.

In this embodiment, as best seen by reference to FIGS. 2, 3 and 4, the roller conveyor assembly of the invention employs separate roller carriage assemblies 36 each consisting of a rectangular frame assembly with longitudinal side bars 38 held together by cross members 40. Each carriage assembly 36 has four cylindrical rollers 42 extending the longitudinal side members 38. The rollers 42 are each formed with axial extensions 44 of reduced diameter at both ends that are journaled for free rotation in circular openings of slightly larger diameter formed opposite one another in both side members 38. The cylindrical rollers 42 have transversely spaced circumferential concave grooves 48 on either side separated from one another by the same distance as that between the rails 28. The inward curvature of the groove cross section closely matches the outer curvature of the rails 28. As shown in the drawings, the carriage assembly 36 is placed upon the rails 28 so that the lower curved surface of the concave groove 48 engages the upper curved surface of the rail 28 for rolling movement so that the transverse position of the carriage assembly 36 is maintained.

The material to be treated is preferably carried in specially shaped, essentially flat bottomed containers 50, or "boats" as they are more commonly known, that are supported on the upper surfaces of the rollers 42 for longitudinal movement. The elongated containers 50 are provided with longitudinal convex ridges 52 along their entire length each having a circular cross sectional curvature matching that of the concave roller grooves 48. The containers 50 illustrated each have three longitudinal grooves 52 with the two outer ones spaced apart by the same distance as the rails 28 and a central one that fits into an additional concave groove 54 provided in each of the cylindrical rollers 42. These ridges 52 serve to maintain the transverse position of the containers 50 as they are moved longitudinally over the rollers 48.

As may be seen from the drawings, in particular FIG. 4, the entire weight of the material load and the container 50 is supported on the longitudinal track assembly rails 28 solely by the rollers 42. The bearing surfaces between the roller axles 44 and the holes in the frame side members 38 support only the weight of the rectangular frame assembly of the carriage 36. As the carriage 36 is rolled along the rails 28, the rotation of the rollers 42 moves the containers 50 forward over the carriage so that the material load actually travels at twice the speed and over twice the distance moved by the carriage assembly.

In operation, referring again to FIG. 1, the furnace is prepared for processing a batch of material to be heat treated by supplying heat generating power to the heater element 20, which is normally a hollow graphite cylinder connected to an appropriate high current capacity electrical power source, and the pump (not shown) supplying cooling water to the tubes 26 is energized. When the temperature within the hot zone 18 has reached the desired high temperature, a number of carriage assemblies 38 are first inserted one after the other through the loading entrance 16 with the outer circumferential grooves 48 on each of the rollers 42 placed to fit onto the rails 28. Previously inserted carriage assemblies 38 are moved forward along the rails 28 by those being inserted behind. Since in the particular arrangement shown, the material containers move longitudinally over the tracks at twice the speed and over twice the distance traveled by the underlying carriage assemblies 38, the number of carriages initially inserted should extend at least half way from the loading entrance 16 to the unloading exit 24 to insure that the first material container or boat 50 will be supported on the rails throughout the entire length of its travel through the furnace 10. After this is done, the containers 50 loaded with the material to be treated can be inserted through the loading entrance 16 along with additional carriage assemblies 38 underneath for support. The containers 50 are moved forward with their supporting carriage assemblies 38 as additional loads are inserted through the preheat section 14 into the hot zone 18 where each container is allowed to remain for the interval of time necessary for properly treating the material. Movement of a load through the furnace is controlled by properly timing the insertion of additional containers 50 and carriage assemblies 38. After treatment the container 50 leaves the hot zone 18 and enters the cooling section 22 and eventually reaches the unloading exit 24. The exit end may preferably be closed by an appropriate cover or door to prevent excessive escape of heat through that end of the furnace housing 12, and an appropriate pushbutton switch 54 positioned to be contacted by the forward end of the container 50 to signal the arrival of a load of material at the exit to be unloaded. During continued operation, the containers 50 and the underlying carriage assemblies 38 are simply removed from the exit to be reinserted at the entrance with additional loads of material.

With the preferred embodiment illustrated in FIGS. 1, 2, 3 and 4, the entire material load is supported solely on the curved areas of contact of the upper and lower surfaces of the circumferential grooves 48 with the lower surface of the container ridges 52 and the upper surface of the rails 28. The areas of contact within the grooves 48 are sufficient in most instances to avoid excessive bearing pressures that might produce galling of the heat softened surfaces, and the direct contact of these oppositely curved surfaces provides maximum resistance to any transverse deviation of the carriage assembly 38 or the container 50. However, when the conveyor system must operate at or near the upper temperature limits of the materials being employed, the tendency of the surfaces to gall may be decreased simply by enlarging the areas of surface contact to reduce bearing pressure. This may be achieved to some extent by enlarging the radii of curvature of the circumferential grooves 48, the ridges 52 and the rails 28, or if necessary by including additional roller grooves and mating rails and container ridges.

Referring now to FIG. 5, the contact area between bearing surfaces can be maximized with only slight sacrifice in guiding the longitudinal movement by having the elongated outer cylindrical surfaces of the rollers 42 in contact with flat rolling surfaces along their entire length between the grooves. In the particular arrangement illustrated in FIG. 5, the track assembly has positioned between and on either side of the rails 28 flat sheets 56 that rest upon or are affixed to the flat upper surfaces of the metal partitions 34 to form a flat horizontal pathway. In the alternative, the track assembly may consist of formed sheets having upwardly extending protruding ridges similar to the bottom container surfaces. In this embodiment, there are only two roller grooves 48 and correspondingly only two longitudinal ridges 52 on the lower surface of the container. Both the rails 28 and the longitudinal container ridges 52 extend only partially into the adjacent concave grooves for guidance so that the load is supported along the outer cylindrical surfaces of the rollers 42.

While roller conveyor systems of this invention are particularly advantageous for providing continuous processing at furnace temperatures where conventional conveyor systems could not operate even if constructed of special high temperature materials, the unique principals involved are generally applicable with similar advantageous results for any continuous processing application at extreme temperatures, particularly in the range above 1000° F. Of course, the materials employed in the construction of the various elements of the invention, particularly those located within the hot zone 18, must be able to maintain structural and operational integrity at the upper temperature limits of the furnace. For example, certain nickel based alloys of the aluminum-titanium age type that maintain sufficient strength at high temperatures due to precipitation of a "gamma phase" can be employed for temperatures up to approximately 2000° F. High purity molybdenum and certain of its alloys suitable for temperatures up to approximately 3200° F., and graphite, pure tungsten and thoriated tungsten are capable of maintaining operational integrity up to as high as 5000° F. Although conventional conveyor systems might be constructed with such high temperature materials, these materials are relatively inexpensive and rather difficult to work or machine properly and could only operate at much lower temperatures. Therefore, the present system in accordance with this invention permits the lower cost and more easily workable materials to be used for a particular temperature requirement, and also offers the advantage of relative structural simplicity that avoids intricate and precise machining of components.

Referring now to FIGS. 6 and 7, it may be desirable in some instances to provide a continuous processing furnace in which the material loads are automatically loaded and unloaded and conveyed through the furnace without the necessity for direct handling during the processing. In such cases, the principles of the invention can be employed to construct a continuous chain roller conveyor loop wherein each successive cylindrical roller 42 is journaled for rotation by individual side frame members 60 extending between the adjacent succeeding and preceding rollers to form an endless chain. As shown in FIG. 7, the end axles 44 of the rollers 42 are journaled in holes extending through overlapping ends of adjacent side frame members 60 that each have oppositely formed necked down portions at the ends so that the adjacent side frame members 60 can be angularly displaced with respect to one another about the roller axle 44. Opposing pairs of side frame members 60 on either side of the rollers 42 are held together by cross frame members 40, at least one of which in the chain may be removable, such as by the provision of a threaded end with an accompanying bolt (not shown), to permit opening of the chain for insertion and removal from the furnace. The upper portion of the chain is placed so that the cylindrical rollers 42 roll upon the underlying track rails 28 to support the material containers 50 and their loads. The lower portion of the chain travels in the opposite direction along a return path, preferably a flat surface 68 provided at the bottom of the furnace. A curved end piece 70 may be provided at each end of the track assembly to aid the movement of the rollers 42 between the lower return track 68 and the upper track assembly provided by the rails 28. With this arrangement, the load containers 50 can be supplied through the entrance of the furnace onto the roller conveyor from loading platform 64 with a conventional fixed roller conveyor and removed from the furnace onto unloading platform 66 with a conventional roller conveyor. In this arrangement, more efficient use may be made of the high temperature materials with some improvement in the overall result locating the continuous chain roller assembly only in the high temperature regions of the furnace. Of course, the chain assembly, because of the return loop, normally requires at least twice as many roller assembly elements for a given conveyor length, as compared with the straight path, non-return embodiments, such as that illustrated in FIG. 1. However with the continuous chain assembly confined only to the central high temperature region, the conventional roller conveyor loading and unloading platforms 64 and 66 extend into the preheat sections and cooling sections where the lower temperatures permit use of the conventional roller conveyors. Accordingly, the length of the continuous roller conveyor assembly can be significantly shortened to effect savings in the overall cost of materials and construction. In addition, since the elements forming the continuous loop remain within the higher temperature regions they are not subjected to the wide temperature range cycling that would occur in passing completely through the preheat and cooling zones, and thereby avoid stresses resulting from repetitive extreme temperature changes.

While preferred embodiments of the present invention have been illustrated and described herein in order to explain the nature of the invention, it should be understood that various changes, modifications and equivalent arrangements, other than those specifically mentioned herein, may be employed by those skilled in the art without departing from the spirit or scope of the invention as expressed in the appended claims.

What is claimed is:

1. A continuous processing high temperature furnace wherein successive loads are moved horizontally for treatment from an entrance to an exit comprising:
   an elongated furnace structure defining a high temperature hot zone intermediate a preheat section and a cooling section positioned to define a longitudinal horizontal path from the entrance to the exit for movement of the loads in a longitudinal direction through said furnace;
   track means having upper supporting surfaces extending horizontally in the longitudinal direction along said path;
   a plurality of elongated cylindrical roller members disposed parallel to one another with the axes of elongation normal to the longitudinal direction;
   frame means for rotatably journaling said rollers for rolling movement in spaced apart parallel relation along the upper supporting surfaces of said track means;
   the longitudinal distance between adjacent rollers being substantially less than the longitudinal dimensions of the bottom surface of each load means; and,
   individual load means for transporting each successive load having a bottom surface with a substantially constant transverse cross sectional configuration adapted to be supported on the upper surfaces of said rollers for movement thereover along said path, the longitudinal distance between adjacent rollers being substantially less than the longitudinal dimension of said bottom surface.

2. The processing furnace of claim 1 wherein:
said track means comprises spaced parallel rails each having an upper roller engaging surface; and,
said roller members each contain a plurality of circumferential grooves, each groove having a cross sectional configuration for rotatably engaging the upper surfaces of one of said rails.

3. The processing furnace of claim 2 wherein: said load means includes container means for holding a quantity of material to be treated and having a bottom surface a plurality of longitudinally extending ridges, each of said ridges having a lower cross sectional configuration for rotatably engaging the upper portion of said grooves in said roller members so that said containers are supported on said ridges for longitudinal movement over said roller members.

4. The processing furnace of claim 1 wherein:
the upper cylindrical surfaces of said roller members extend vertically above said frame means; and,
each of said load means has a flat bottom surface engaging the upper cylindrical surfaces of said roller members.

5. The processing furnace of claim 1 wherein: said frame means comprises a pair of spaced apart parallel longitudinal frame members having transverse circular openings therein for rotatably receiving the ends of a plurality of said roller members, said longitudinal frame members being maintained in spaced apart parallel relation by a plurality of cross frame members extending therebetween parallel to said roller members and fixedly joined at their opposite ends to said longitudinal frame members, said cross frame members having a diameter substantially less than the minimum diameter of said roller members.

6. The conveyor of claim 1 wherein: said frame members comprise individual frame members extending between adjacent pairs of roller members to form a continuous chain, said continuous chain being formed in a loop having an upper portion moving longitudinally along said track in the direction of load movement and a lower portion moving in the opposite direction along a return path.

7. A conveyor for transporting loads longitudinally through extreme temperatures comprising:
a plurality of elongated cylindrical roller members disposed parallel to one another and normal to the direction of longitudinal movement;
frame means for rotatably journaling said roller members in spaced apart parallel relationship along the longitudinal direction of movement with the distance between adjacent roller members being substantially less and the longitudinal dimension of the bottom surface of each load;
supporting track means having supporting surfaces extending in the desired direction of travel to engage the bottom surface of each of said roller members with the upper surfaces of said roller members supportably engaging the bottom surfaces of said loads; and,
wherein said track means comprises spaced parallel rails each having an upper roller engaging surface extending along the desired direction of movement, said roller members each containing a plurality of circumferential grooves each having a cross sectional configuration for rotatably engaging the upper surface of said rail;
and said load includes container means having a plurality of longitudinally extending ridges protruding from the bottom surface thereof, each of said ridges having a cross sectional configuration for rotatably engaging the upper portions of said grooves so that said container means is supported on said ridges for longitudinal movement in the desired direction,
whereby the load is moved longitudinally along said track means and over the upper surfaces of said roller members and supported on said track means solely by said roller members.

8. A conveyor for transporting loads longitudinally through extreme temperatures comprising:
a plurality of elongated cylindrical roller members disposed parallel to one another and normal to the direction of longitudinal movement;
frame means for rotatably journaling said roller members in spaced apart parallel relation along the longitudinal direction of movement with the distance between adjacent roller members being substantially less than the longitudinal dimension of the bottom surface of each load, said frame means comprising a pair of spaced apart parallel longitudinal frame members having openings therein for rotatably receiving the ends of a plurality of said roller members, said frame members being maintained in spaced apart parallel relation by a plurality of cross frame members therebetween parallel to said roller members and fixedly joined at their opposite ends to said longitudinal frame members, said cross frame members having a vertical dimension substantially less than the minimum diameter of said roller members; and,
supporting track means having supporting surfaces extending in the desired direction of travel to engage the bottom surface of said roller members with the upper surface of said roller members supportably engaging the bottom surfaces of said loads whereby the loads are moved longitudinally along said track means and over the upper surfaces of said roller members and supported on said track means solely by said roller members.

9. A conveyor for transporting loads longitudinally through extreme temperatures comprising:
a plurality of elongated cylindrical roller members disposed parallel to one another and normal to the direction of longitudinal movement;
frame means for rotatably journaling said roller members in spaced apart parallel relation along the longitudinal direction of movement with the distance between the adjacent roller members being substantially less and in the longitudinal dimension of the bottom surface of each load;
supporting track means having supporting surfaces extending in the desired direction of travel to engage the bottom surface of said roller members where the upper surface of said roller members supportably engaging the bottom surfaces of said loads whereby the load is moved longitudinally along said track means and over the upper surfaces of said roller members and supported on said track means solely by said roller members; and,
loading means adjacent one end of said track means for successively inserting individual loads to push against previously inserted loads to move said roller members and said loads in the desired direction of movement along said track members.

10. A conveyor for transporting loads longitudinally through extreme temperatures comprising:
a plurality of elongated roller members disposed parallel to one another normal to the direction of longitudinal movement, each roller member having a length extending at least a substantial portion of the width of said load;
frame means for rotatably journaling said roller members in spaced apart parallel relation along the longitudinal direction of movement with the distance between adjacent roller members being substantially less in longitudinal dimension of the bottom surface of each load; and, supporting track means having supporting surfaces extending in the desired direction of travel and across substantially the entire width of said load to engage the bottom surface of said roller members throughout a substantial portion of their length with the upper surfaces of said roller members supportably engaging the bottom surfaces of said loads along a substantial portion of the width.

11. A conveyor for transporting loads longitudinally through extreme temperatures comprising:

a plurality of elongated cylindrical roller members disposed parallel to one another and normal to the direction of longitudinal movement, each of said roller members containing a plurality of circumferential portions each having a first smoothly curved cross sectional configuration;

frame means for rotatably engaging said roller members in spaced apart relation along the longitudinal direction of movement with the distance between adjacent roller members being substantially less than the longitudinal dimension of the bottom surface of each load; and, supporting track means having supporting surfaces extending in the desired direction of travel to engage the bottom surface of said roller members with the upper surfaces of said roller members supportably engaging the bottom surfaces of said loads whereby the load is moved longitudinally along said track means and over the upper surfaces of said roller members and supported on said track means solely by said roller members, said track means comprising spaced parallel rails each having an upper roller engaging surface with a second smoothly curved cross sectional configuration uniformly extending along the desired direction of travel;

wherein one of said smoothly curved cross sectional configurations is convex with the other being concave to provide a mating relationship therebetween with the convex radius of curvature matching the concave radius of curvature to provide a substantial curved area of rolling contact therebetween.

12. The conveyor of claim 11 wherein: the upper cylindrical surfaces of said roller members extend vertically above said frame means to rotatably engage the bottom surfaces of said loads.

13. The conveyor of claim 11 wherein: said frame members comprise individual longitudinal frame members extending between each adjacent pair of roller members to form a continuous chain, said continuous chain being formed in a loop having an upper portion moving along said track longitudinally in the direction of load movement and a lower portion moving in the opposite direction along a return path.

References Cited

UNITED STATES PATENTS

| 761,088 | 5/1904 | Meyer | 263—8 |
| 1,595,829 | 8/1926 | Furbush | 263—6C |
| 3,248,517 | 4/1966 | Vranken | 263—8 |

FOREIGN PATENTS

| 1,010,143 | 6/1952 | France | 263—8 |

JOHN J. CAMBY, Primary Examiner

U.S. Cl. X.R.

263—8